UNITED STATES PATENT OFFICE.

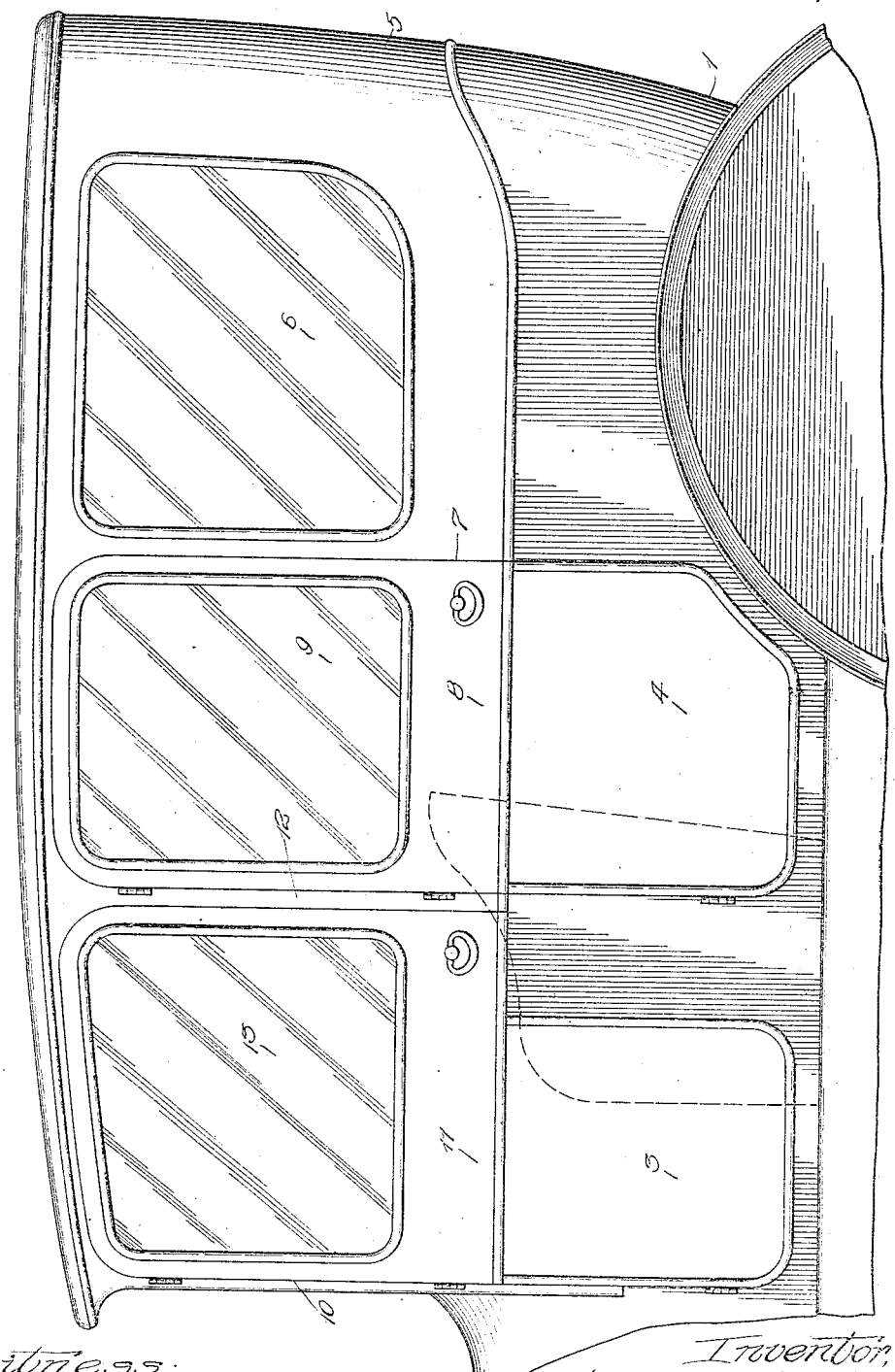

HERMAN G. GROSSE, OF CHICAGO, ILLINOIS.

AUTOMOBILE-TOP.

1,294,447.

Specification of Letters Patent.  Patented Feb. 18, 1919.

Application filed November 12, 1917.  Serial No. 201,647.

*To all whom it may concern:*

Be it known that I, HERMAN G. GROSSE, a citizen of the United States, residing at Chicago, in the county of Cook and State of Illinois, have invented certain new and useful Improvements in Automobile-Tops, of which the following is a specification.

This invention is particularly applicable to automobile tops commonly known as "winter tops" or such as are used to replace the ordinary cape tops.

The objects of this invention are to provide an improved replaceable top; to provide a top having but three windows in the side thereof, and adapted to be applied to a body having two side doors on each side; and to provide a top having a front door of the usual width at the bottom and wider at the top which will have certain advantages to be described more fully hereinafter, and which will harmonize with the remainder of the body.

The accompanying drawing shows a side view of an automobile having my improved top applied thereto.

As illustrated in this drawing, 1 represents the body of an automobile having two doors 3 and 4. My improved top 5 is secured to the body in any well known manner, and is provided at the rear with windows 6. The central portion of the top has an opening 7 for an extension 8 of the door 4. This extension is provided with a window 9, and may be formed integrally with the door 4 or secured thereto.

The principal feature of this invention consists in the arrangements and construction of the front door. The top is provided with an opening 10 for an extension 11 of the door 3, but instead of being of approximately the same width as the door 3, this extension is considerably wider than the door and preferably projects backwardly to the post or support 12 for the rear door. With this arrangement it will be seen that the opening 10 extends approximately from the wind-shield or front post to the back of the front seat. The extension 11 may be formed integrally with the door 3, or may be secured thereto in any convenient manner. This extension is provided with a large window 13 which is made to harmonize with the windows 6 and 9. In this manner the top is provided with three large windows instead of having the usual small panel between the two doors.

On account of my improved construction whereby the front door is made with the additional width at the top, the automobile is much easier of access than with the usual doors which are comparatively narrow throughout their full length. This is particularly advantageous in entering the front compartment from the side upon which the steering post and wheel are located. Furthermore, it provides a large window which gives full side vision to the driver, at either side of the automobile. This arrangement also permits the top to be constructed so that it will have an artistic and pleasing appearance.

Having thus described my invention, what I claim and desire to secure by Letters Patent is—

1. The combination with an automobile body and top therefor, said body and top having openings for a front door, of a front door of the usual width for the body portion, said door having an upper portion for the top which is wider than the bottom portion and projects rearwardly to approximately the back of the front seat and is rigid with said bottom portion, and hinges at the front of the door for supporting same.

2. The combination with an automobile body and top having side openings at the front, of a door for closing said openings, said door hinged at the front and having a relatively narrow bottom portion and a wide upper portion, the upper portion being provided with a window extending from approximately the front of the top to the back of the front seat, the hinges being located at the top and bottom of the door and in alinement with each other.

HERMAN G. GROSSE.

Copies of this patent may be obtained for five cents each, by addressing the "Commissioner of Patents, Washington, D. C."